US007475421B2

(12) United States Patent
Abdo et al.

(10) Patent No.: US 7,475,421 B2
(45) Date of Patent: *Jan. 6, 2009

(54) AUTOMATIC RE-AUTHENTICATION

(75) Inventors: Nadim Y. Abdo, Redmond, WA (US); Adam J. Overton, Redmond, WA (US); Jason Garms, Woodinville, WA (US); John E. Parsons, Jr., Sammamish, WA (US); Alvin Loh, Sammamish, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/275,711

(22) Filed: Jan. 25, 2006

(65) Prior Publication Data

US 2006/0117106 A1 Jun. 1, 2006

Related U.S. Application Data

(63) Continuation of application No. 10/116,803, filed on Apr. 1, 2002, now Pat. No. 7,080,404.

(51) Int. Cl.
*H04L 9/00* (2006.01)
*G06F 21/00* (2006.01)
*G06F 15/16* (2006.01)

(52) U.S. Cl. .......................... 726/3; 713/176; 709/227
(58) Field of Classification Search .................. None
See application file for complete search history.

(56) References Cited

U.S. PATENT DOCUMENTS

| 5,708,780 | A | 1/1998 | Levergood et al. |
| 5,740,361 | A | 4/1998 | Brown |
| 6,085,247 | A | 7/2000 | Parsons, Jr. et al. |
| 6,092,196 | A | 7/2000 | Reiche |
| 6,341,312 | B1 | 1/2002 | French et al. |
| 7,080,404 | B2 | 7/2006 | Abdo et al. |
| 2002/0194473 | A1 | 12/2002 | Pope et al. |
| 2003/0236905 | A1 | 12/2003 | Choi et al. |
| 2005/0198379 | A1 | 9/2005 | Panasyuk et al. |
| 2005/0246445 | A1 | 11/2005 | Panasyuk et al. |

FOREIGN PATENT DOCUMENTS

| EP | 1351467 A1 | 10/2003 |
| WO | WO0069110 | 11/2000 |

OTHER PUBLICATIONS

European Search Report mailed on Jun. 15, 2007 for Application No. 03004229.5-2413, 4 pgs.
Freier et al., "The SSL Protocol Version 3.0," Transport Layer Security Working Group Internet Draft, Nov. 18, 1996, pp. 1-63.
Examination Report in European Patent Application No. EP-03004229.5-2413, dated Jan. 15, 2008, 4 pgs.
Response to Examination Report (Jan. 15, 2008) in European Patent Application No. EP 03004229.5-2413, Jul. 3, 2008, 24 pgs.

*Primary Examiner*—Christopher A Revak
(74) *Attorney, Agent, or Firm*—Merchant & Gould P.C.

(57) ABSTRACT

Upon successfully authenticating a client device with a server system, the client device and server system share auto-reconnect data. Upon subsequently losing and re-establishing communications with the server system, the client sends an auto-authenticate request to the server. The auto-authenticate request includes a session verifier that is based at least in part on the shared auto-reconnect data. The server validates the session verifier. If the validation is successful, the server automatically re-authenticates the client device.

14 Claims, 5 Drawing Sheets

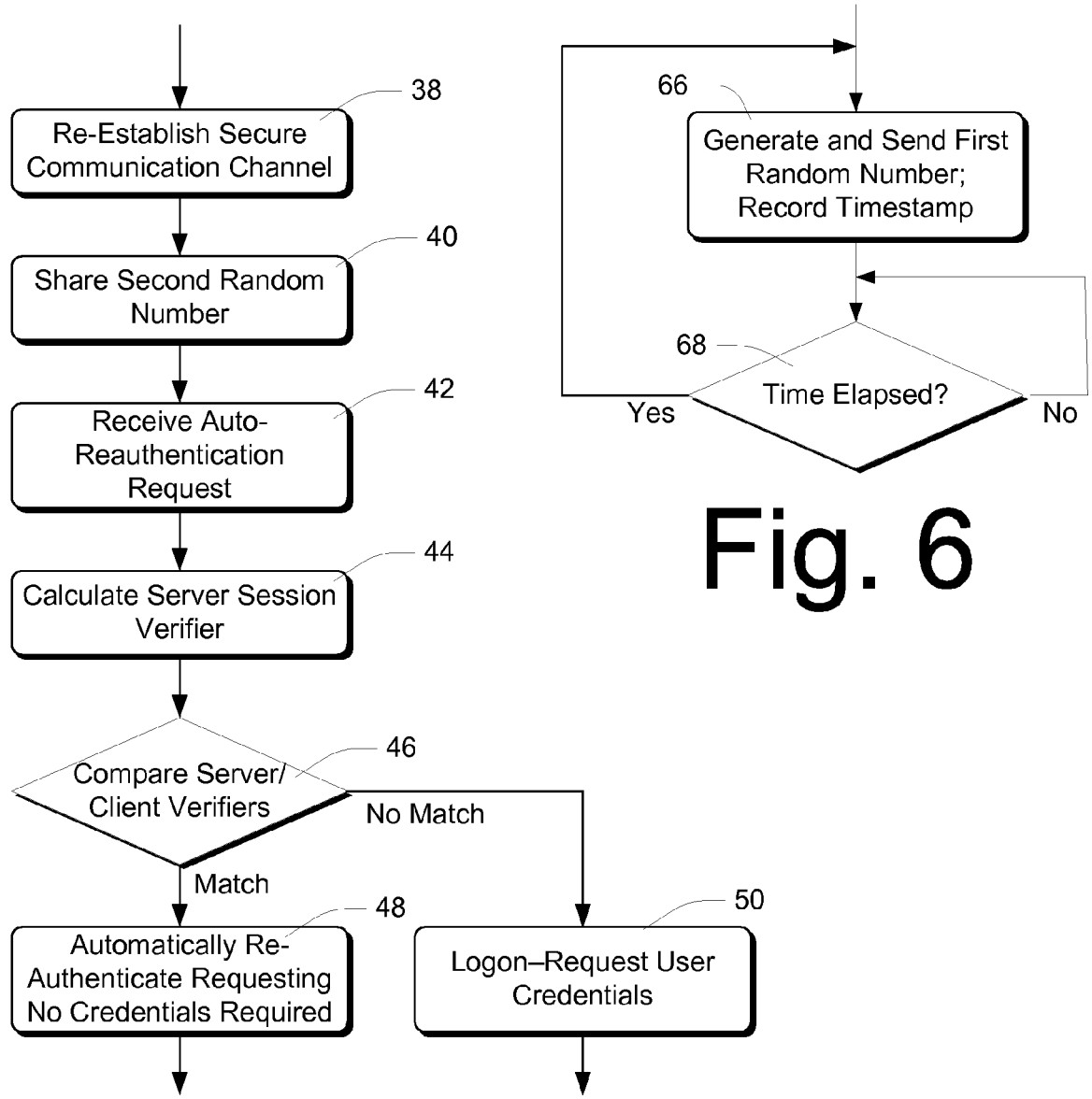

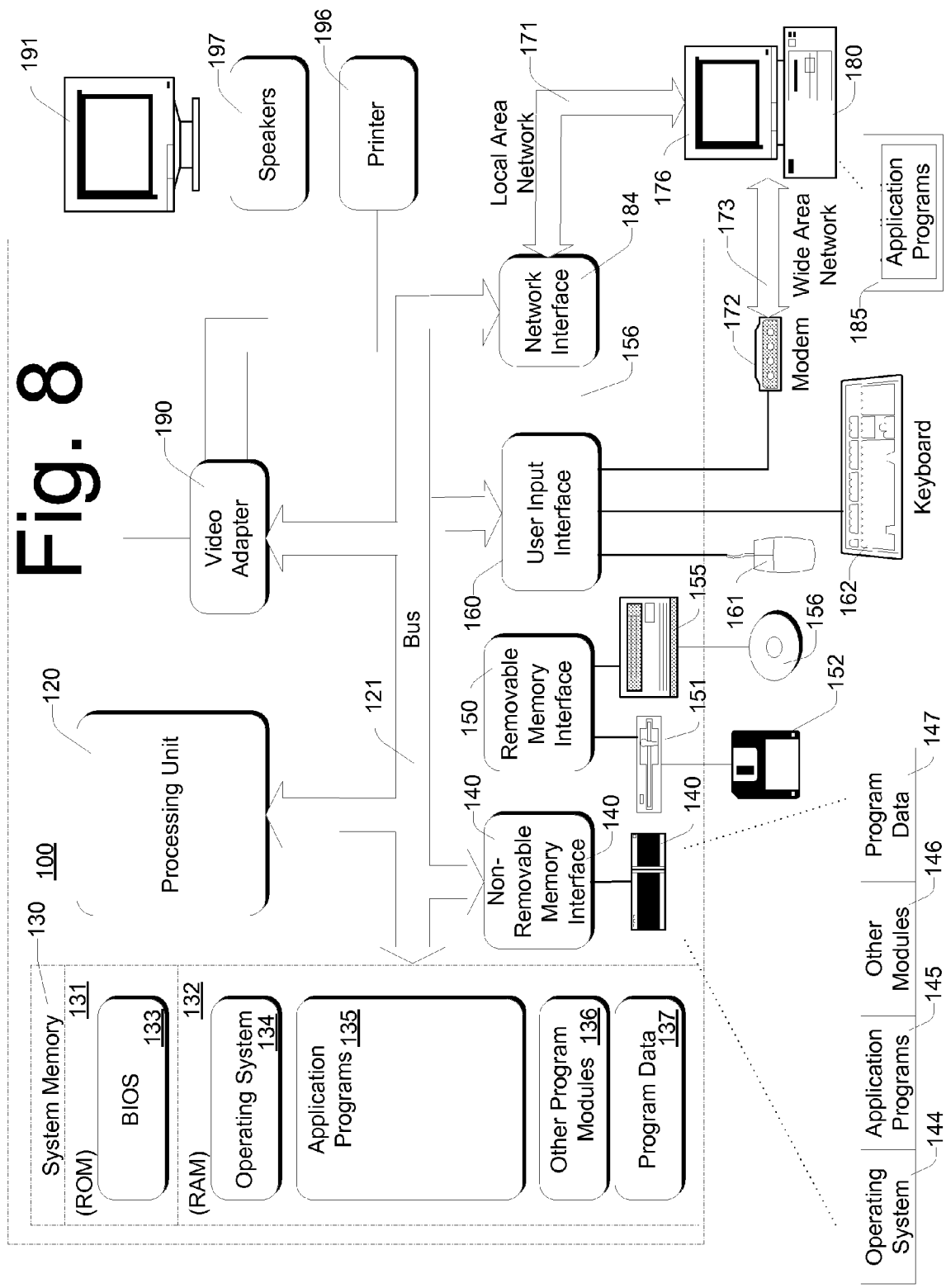

AUTOMATIC RE-AUTHENTICATION

RELATED APPLICATIONS

This application is a continuation of and claims priority to U.S. patent application Ser. No. 10/116,803 entitled "Automatic Re-Authentication" filed Apr. 1, 2002 to Abdo et al., now issued as U.S. Pat. No. 7,080,404 on Jul. 18, 2006, the disclosure of which is incorporated by reference herein.

TECHNICAL FIELD

The invention relates to user and session authentication in systems having remote terminals.

BACKGROUND

Certain versions of the Microsoft® Windows® server operating system support "Terminal Services." Using Terminal Services, a server system can deliver a conventional Windows® desktop, as well as the latest Windows®-based applications, to a remotely located desktop computing device which is referred to as a client device or remote terminal. The remote terminal is often a personal computer running specialized terminal emulation software. In the Microsoft® Windows® environment described herein, the remote terminal runs software that is specifically designed for operation with Windows® Terminal Services.

When a user runs an application in this environment, most or all of the application execution, data processing, and data storage take place on the server; only things such as keyboard, mouse, display, and print information are transmitted back and forth between the server and the remote terminal.

A single server system can support multiple users and corresponding user sessions. Each user logs on and sees only their individual session, which is managed transparently by the server operating system and is independent of any other client session.

Communications between the server system and the various remote terminals are frequently by means of a network of some sort. The network might be a private local-area network, a private or public wide-area network, or a publicly-accessible network such as the Internet. Various forms of encryption are utilized between the server system and the remote terminals to ensure privacy and data integrity over these otherwise unsecure forms of network communications. Both the server system software and the remote terminal software are designed to support this encryption.

Microsoft® Windows® Terminal Services utilizes RDP (remote desktop protocol), a presentation services protocol that governs communications between the server system and the remote terminals. RDP uses its own video driver on the server system to render display output by constructing the rendering information into network packets and sending them over the network to the client device. The client receives the rendering data and interprets it into corresponding Win32® GDI API calls. Similarly, client mouse and keyboard messages are redirected from the client to the server. At the server, RDP uses its own virtual keyboard and mouse driver to receive these keyboard and mouse events. In addition to these basic input/output functions, RDP provides support for various other features, such as print redirection, clipboard mapping, remote control, and network load balancing. In addition, RDP enables data compression, data encryption, and logon and logoff services. RDP communications are typically packaged or embedded within the TCP/IP protocol.

The server system is capable of executing a number of different sessions. Each user session is typically associated with a single user and remote terminal, although the same session might be associated with different remote terminals during different time periods. To initiate a user session, the user establishes a secure connection between a particular client device and the server system. The server system then utilizes the I/O capabilities of the client device to authenticate the user, in a process referred to as a "logon" process. Authentication is typically performed by requesting user credentials, which normally comprise a user name and password. Upon receiving valid credentials, the server system creates a session and connects the client device to that session.

In many networked environments, and particularly in the Internet environment, data connections are unreliable and can be easily lost. In the Terminal Services environment described above, losing data communications between the server system and the client device does not necessarily terminate the session associated with that client device. Rather, the session is kept active for a predefined time period, and the user can log back on to that session using the same client device or a different client device. The logon process is similar to the initial logon process, in that the server system authenticates the user by requesting user credentials. Rather than creating a new session, however, the server system recognizes the user as being associated with an existing session, and reconnects the user to that session. In some systems, the client device might retain a session identifier from the previous session and submit the session identifier during the subsequent logon process to reconnect to that session.

SUMMARY

Upon successfully authenticating a client device with a server system, the client device and server system share auto-reconnect data. Upon subsequently losing and re-establishing communications with the server system, the client sends an auto-authenticate request to the server. The auto-authenticate request includes a session verifier that is based at least in part on the shared auto-reconnect data. The server validates the session verifier. If the validation is successful, the server automatically re-authenticates the client device.

BRIEF DESCRIPTION OF THE DRAWINGS

FIGS. 2-6 are flowcharts showing steps performed by the server system and client devices shown in FIG. 1.

FIG. 8 is a block diagram of a exemplary computer that might be programmed to perform the functions described herein.

DETAILED DESCRIPTION

The following description sets forth specific embodiments and elements of a client/server system that incorporate elements recited in the appended claims. The embodiments are described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Figure 1:
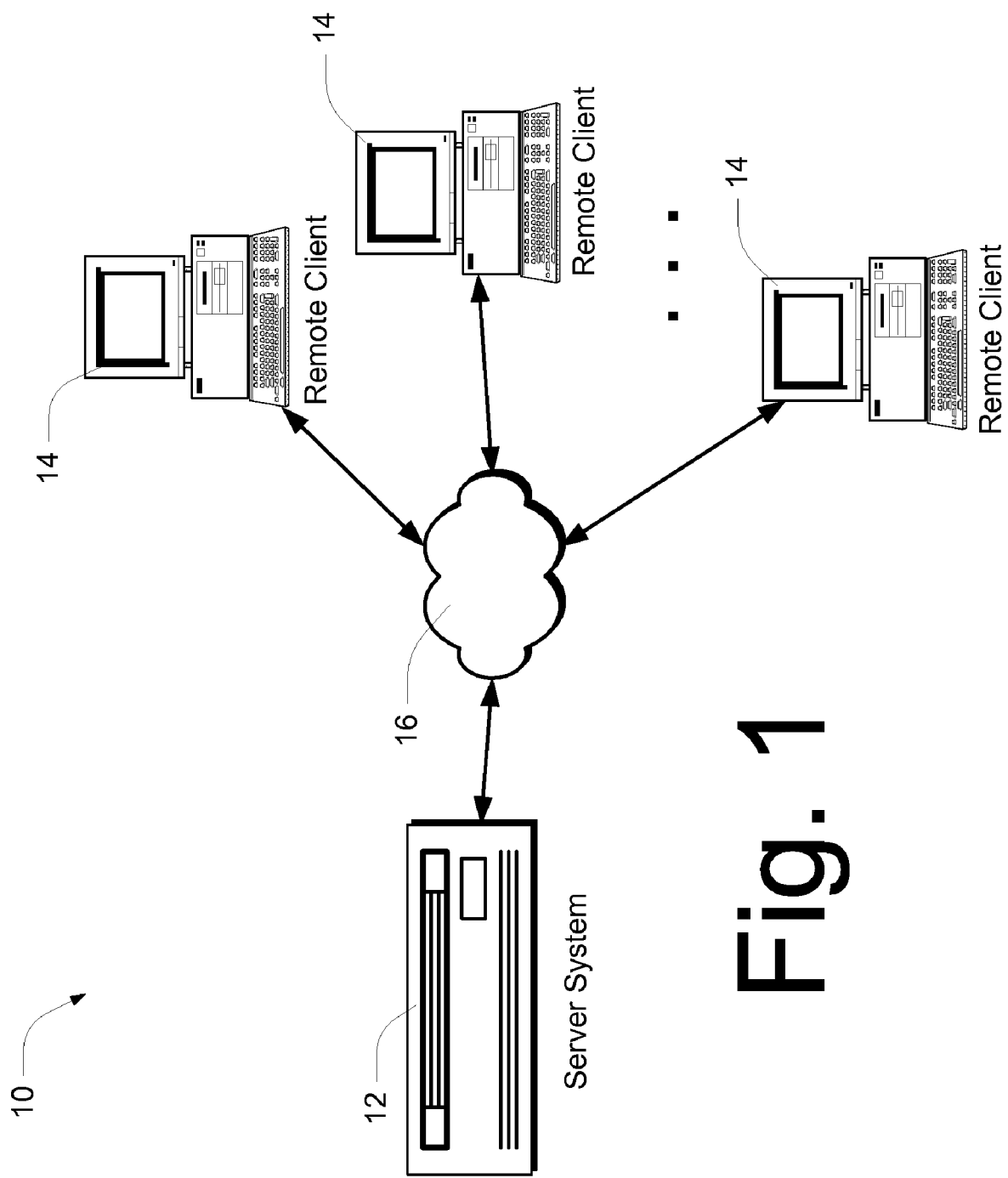
FIG. 1 is block diagram of a client/server system that incorporates elements of the invention described below.

FIG. 1 shows an exemplary embodiment of a terminal server system 10. System 10 includes a server computer or system 12 and a plurality of remote terminals or client devices 14. Remote clients 14 communicate with server computer 12 by means of a network 16, which may be a local-area network, a wide-area network, a publicly-accessible network such as the public Internet, or some other type of data communications network. Alternatively, one or more of remote clients 14 might utilize non-network means of communications with server system 12, such as dedicated or on-demand dial-up connections, or other forms of direct or point-to-point data communications.

Both the server system 10 and the individual client computers are conventional, general desktop computers or computers of other types, although specialized computers and other more specific-purpose devices might also be used to perform the functions of these components. A specific and detailed example of a computer suitable for performing the described functions will be set forth below, in conjunction with FIG. 8.

In the described embodiment, server system 12 runs a version of the Microsoft® Windows® server operating system and includes terminal server features such as those described above, generally referred to as "Terminal Services." As noted above, application programs in this environment execute on server system 12 rather than on the individual client devices 14. Keyboard, mouse, display, and print information, however, is transmitted back and forth between the server and the remote terminal. This division of responsibility is generally transparent to users. To a user, it appears just as if the applications were running on the client device; user interface functions, including graphical interface elements and user input functions are carried out through the client device. In many cases, the client device will be configured with terminal emulation software to coordinate these functions with the server.

The Terminal Services of the Microsoft® Windows® server operating system executes multiple server sessions in conjunction with remote terminals or client devices 14, wherein user applications execute primarily on the server system and user I/O is performed through the client devices. The term "session" refers generally to a set of changing state information associated with a given client device. In a terminal server environment such as that described herein, this state information resides on server system 12 rather than on individual client computers 14. The session or state information for a given client computer relates to whatever application programs are being executed by server system 12 on behalf of the client computer.

It should be noted that although the invention is described as being implemented within the Microsoft® Windows® server operating system and its Terminal Services components, other implementations are also contemplated. The invention can be used in a variety of situations where a server authenticates clients as a condition to allowing such clients to utilize services of the server. The invention is especially useful in situations where server/client communications are unreliable and subject to interruptions.

FIGS. 2-5 show actions performed by server system 12 and client device 14 relating to authentication and automatic re-authentication after a communications failure. Note that the actions shown in FIGS. 2-5 are performed by software running on either server system 12 or on one of client devices 14. In the described embodiment, the actions are integrated within the Terminal Services software running on server system 12 or within the terminal emulation software running on client devices 14. In other embodiments, the described actions can be integrated with other types of software.

Figure 2:
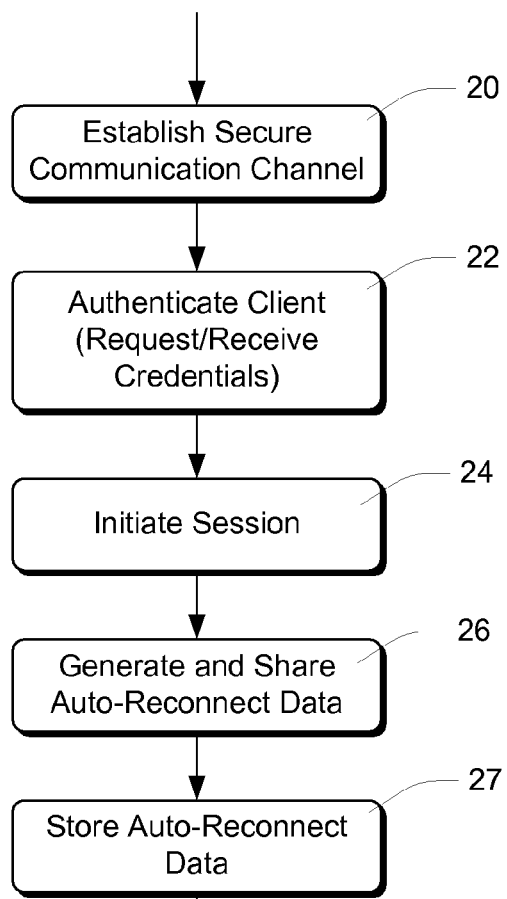

FIG. 2 shows actions performed by server 12 in establishing a new session for a particular client device. An initial action 20 comprises establishing a secure data communications channel between server system 12 and client device 14. In the described embodiment, this is accomplished using the RDP (Remote Desktop Protocol) and various encryption techniques employed by RDP. RDP uses RC4, a secret key cryptographic method developed by RSA Data Security, Inc., of Redwood City, Calif., to secure the communications channel. SSL (secure sockets layer) is another example of a security protocol that might be used to provide a secure communications channel. The term "secure" is used to indicate that communications between the server and client are relatively free from potential interception or eavesdropping. When using a relatively unsecure communications medium such as the Internet, communications security is normally provided by encryption. However, encryption may not be necessary if the communications medium itself is secure.

A subsequent action 22, which is performed over the secure communications channel using RDP, comprises authenticating the client or client device for a server session. In many cases, this action comprises a logon process in which the user is requested or prompted at the client device for user credentials such as a user name and password, which are in turn received and validated by the server.

Although the user credentials often comprise a user name and password, other types of credentials may also be utilized. For example, the user might be prompted to provide biometric information such as a fingerprint or retinal scan, to provide a hardware token such as smart card or other device, or to provide some other form of identification.

In many cases, authentication will be under control of the server system 12, which transmits graphical prompts for display at client device 14 and in turn receives user credentials from client device 14. In some cases, the terminal emulation software running on client device 14 may have special security features that operate in conjunction with the server software to enhance the security of the logon process.

Following a successful authentication or logon process, an action 24 comprises initiating a session on server system 12 for the requesting client device.

A further action 26, which can be performed before, after, or concurrently with initiating the client's session, comprises generating and sharing auto-reconnect data with the client device. The auto-reconnect data comprises a session ID number and a first random number. In the described embodiment, both of these numbers are generated by the server system 12 and sent to client device 14 over the secure communications channel. The session ID is a number that is associated with the client's current server session and that is unique among currently executing sessions. The first random number is a 16-byte number that is generated using a cryptographically secure random number generator, and might include pseudo-random numbers.

An action 27 comprises storing the auto-reconnect data at the server for later use. In conjunction with the auto-reconnect data, the server also stores a reference to the server session for which the auto-reconnect data was generated.

Figure 3:
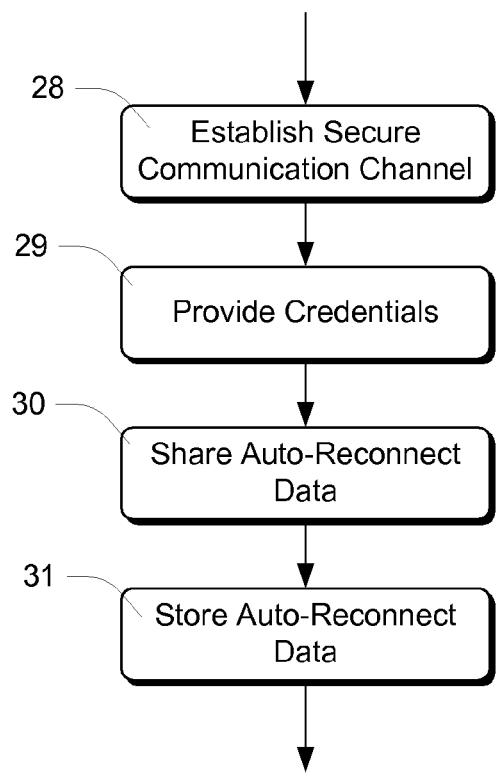

FIG. 3 illustrates actions performed by client device 14 in establishing a new session for a particular client device. For the most part, these actions are counterparts of the actions illustrated by FIG. 4.

An action 28 comprises requesting and establishing a secure communications channel between client device 14 and server system 12, using RDP as described above. A subsequent action 29 comprises providing user credentials to server system 12 in a logon process to authenticate client device 14 with server system 12 and to initiate a server session associated with client device 14.

An action 30 comprises sharing auto-reconnect data with the server system. As already described, the auto-reconnect data comprises a session ID number and a first random number. In the described embodiment, both of these numbers are received from the server system. In other embodiments, one or both of these numbers might be generated by the client device and sent to the server.

An action 31 comprises storing the auto-reconnect data at the client device 14. For security purposes, these numbers are preferably stored in volatile program memory rather than in the non-volatile file system of the client device, so that the auto-reconnect data is difficult to access from other application programs that might be executing on client device 14.

Figure 4:
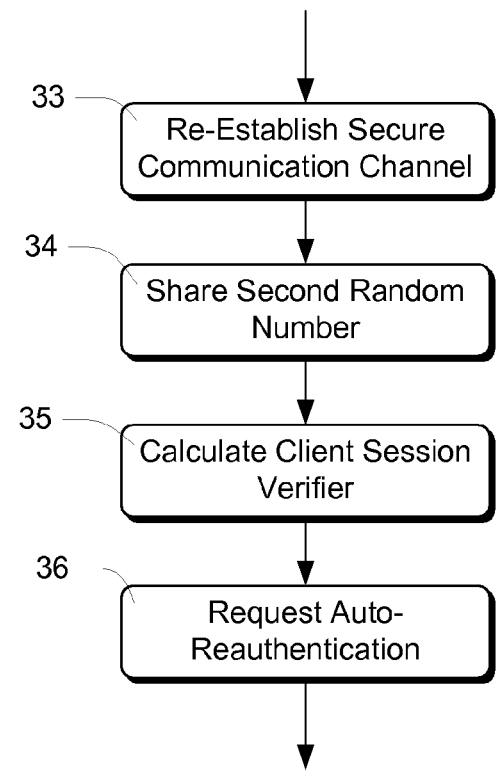

FIG. 4 illustrates actions performed by client device 14 after losing and re-establishing communications with server system 12. The loss of communications might result from a data error, timeout, communications media failure, or any one of a number of different events. In many cases, such a communications loss is temporary, and the user is able to re-connect client device 14 with server system 12 after a short delay. Reconnection often involves a manual step performed by the user. The reconnection process can, however, be automated. Specifically, the terminal emulation software of client device 14 can be designed to automatically and repeatedly attempt to reconnect to server system 12 after a communications loss.

Whether or not the reconnection process is automated, the eventual result is an action 33 of re-establishing of a secure communication channel between client device 14 and server 12. Once such a communications channel is re-established, the client and server share a second random number in an action 34. The second random number is a different value than the first random number, but is generated by server system 12 in a manner that is similar or identical to generation of the first random number. Thus, the second random number is a 16-byte value that is received by client device 14 from server system 12.

An action 35 then comprises calculating or deriving a client session verifier at the client device from at least a portion of the auto-reconnect data. More specifically, this comprises deriving the client session verifier at least in part from the first random number, and at least in part from the second random number. In the described embodiment, the session verifier is a one-way hash of some combination of the two random numbers. For example, the two numbers might be added, multiplied, or concatenated together, after which a one way hash is performed on the result to yield the session verifier. HMAC (hashed message authentication code) is an example of a suitable one-way hash function. Other hash functions could alternatively be used.

An action 36 comprises requesting automatic re-authentication by the server system without providing user credentials. In the described embodiment, this action comprises sending an auto-authenticate request from the client device to the server system. The auto-authenticate request includes (a) the session ID (previously received in action 32) and (b) the session verifier calculated in the previous action. Assuming that this request is successful, the client device is reconnected to the original server session. Note that the client device is not required to store the user credentials in order to provide automatic re-authentication.

FIG. 5 illustrates actions performed by server system 12 after losing communications between client device 14 and server system 12. An action 38 comprises re-establishing a secure communications channel between client device 14 and server system 12. This is accomplished in response to client-initiated communications, utilizing the encryption features of RDP or other encryption technologies.

A subsequent action 40 comprises generating and sharing the second random number between server system 12 and client device 14. In the described embodiment, this second random number is generated by server system 12 in a manner that is similar or identical to generation of the first random number. In other embodiments, the client device might be responsible for generating the second random number, and for sending it to server system 12.

An action 42 comprises receiving the auto-authenticate request from the client device 14. As already mentioned, the auto-authenticate request includes (a) a session ID and (b) a client session verifier that has been calculated by the client device 14 as already described.

An action 44 comprises calculating or deriving a server session verifier. The server session verifier is calculated in the same manner as the client session verifier, by taking a one-way hash of the first and second random numbers.

An action 46 comprises validating the client session verifier by comparing it to the server session verifier. If the two verifiers match, the validation is successful and an action 48 is performed of automatically re-authenticating the requesting client device for the session indicated by the session ID received in the auto-authenticate request—without requesting user credentials. Once authenticated for the requested session, the client device is re-connected to that session and normal session operations resume. If the two verifiers do not match, the validation is not successful and the auto-authenticate request is refused. In this case, the client device is not re-connected to the requested session, and a more conventional user logon process 50 is initiated—typically requiring the user to enter his or her user credentials.

Actions 26 and 27 of FIG. 2 and actions 30 and 31 of FIG. 3 are repeated every time a client device is re-authenticated for a particular session. That is, the first random number is re-generated and shared anew between the server system and the client device after every successful re-authentication. This assures that only one client device at a time can connect to a particular session.

As an optional feature, at least a portion of the auto-reconnect data is automatically regenerated and shared anew at predetermined time intervals. Specifically, the first random number is re-generated and re-shared between server system 12 and client device 14 approximately every hour. Once a newly generated first random number is shared between the server and the client, the old random number is invalidated and will no longer work for reconnection.

FIG. 6 shows the process for periodically changing the random number portion of the auto-reconnect data and sending it to the client. An action 66 comprises generating and sending the first random number to the client and recording a timestamp. A subsequent action 68 comprises comparing the timestamp to the current time to determine whether a predetermined time period, such as an hour, has elapsed. If it has, execution loops back to action 66 where a new random number is generated and sent to the client, and a new timestamp is recorded. If the time period has not expired, block 68 is reiterated until the result of the comparison is true, whereupon action 66 is executed again.

Figure 7:
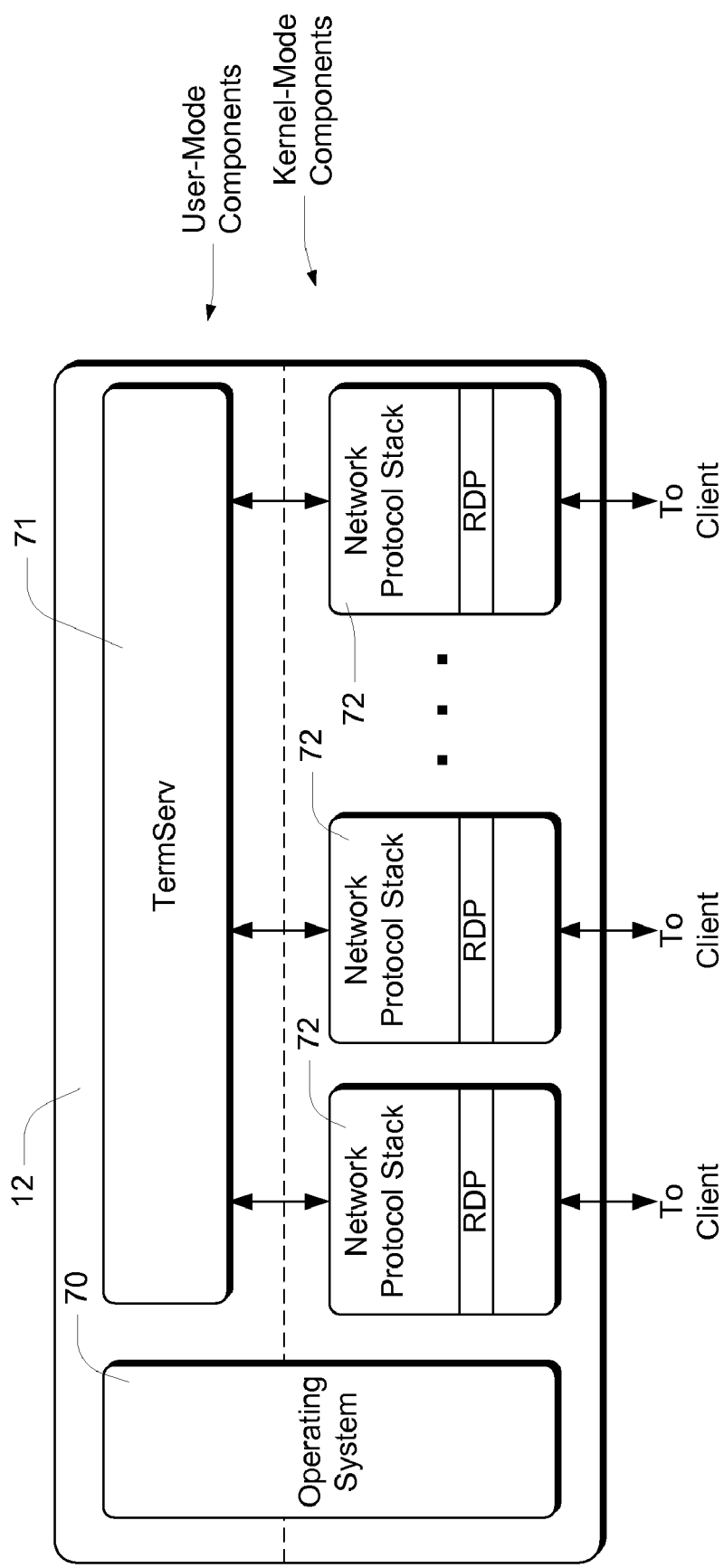
FIG. 7 is a block diagram showing how components of the server system of FIG. 1 execute with regard to user and kernel modes of a computer.

FIG. 7 shows pertinent details of how the server system 14 is implemented within the operating system of a computer. In this embodiment, the computer has an operating system 70 which supervises what are known as user and kernel modes. Programs or program components typically run in one of these two modes. Kernel mode is typically reserved for lower-level system software components that are relatively critical to operation of the computer. Application programs typically run under the operating system in the non-kernel user mode, and make calls to components of the kernel mode in order to perform system-level functions. The kernel mode is typically supported by the microprocessor hardware of the computer.

In the described embodiment of a terminal server system, there are one or more user-level server components 71 that manage user sessions and perform various functions associated with user sessions. In addition, there are multiple protocol stacks or communications components 72 that run within the kernel mode to perform lower-level communications functions between the server and the respective clients. Generally, there is a single protocol stack 72 for each session and corresponding client device 14. The stack manages communications under the RDP protocol and under lower-level protocols such as TCP, IP, UDP, etc. Generally, communications between server component 71 and the multiple protocol stacks 72 are by way of function calls made by server component 71 to stacks 72.

In the described embodiment, the protocol stack 72 for a particular session is responsible for generating and sending the first random number to the associated client device, and for re-generating and re-sending the first random number at periodic intervals. Specifically, every time protocol stack is called upon to perform server/client communications, it checks to see if the predetermined time period has elapsed and regenerates and re-sends the first random number if the time period has elapsed. This allows the random number to be changed and re-sent without instigation by the terminal server component 71. Using this technique, a new random number is sent only if the predetermined time period has elapsed and only if the protocol stack is active in sending or receiving data.

This architecture is advantageous because it avoids the use of a dedicated user-mode "spin" thread that might be otherwise necessary in order to periodically re-send the first random number to the client at periodic intervals. The use of such a thread would potentially be expensive in terms of computer resources. Thus, the elimination of such a thread is a significant advantage.

During the auto-reconnect process, a received auto-reconnect request is processed by a new protocol stack 72 and passed to terminal server component 71. As part of this request, the terminal server component receives a session ID and a client session verifier. In order to find the current first random number associated with the session identified by the received session ID, the server component 71 identifies the protocol stack 72 that was associated with the session before the communications failure, and queries that protocol stack for the most recent first random number that was shared with the client for that session. The server component then uses that random number to calculate the server session verifier and to validate the session verifier received from the client.

The various components and functionality described above are implemented with individual computers. FIG. 8 shows components of typical example of such a computer, referred by to reference numeral 100. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps and actions described above in conjunction with microprocessors or other data processors. The invention also includes the computer itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media include both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 100 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 8 provide storage of computer-readable instructions, data structures, program modules, and other data for computer 100. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 8. The logical connections depicted in FIG. 8 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A server system programmed to perform actions comprising:
   authenticating a client device for a particular server session;
   sharing auto-reconnect data with the client device, the auto-reconnect data including a session ID associated with the particular server session and a first random number;
   after losing communications with the client device, sharing a second random number with the client device, and receiving from the client device the session ID and a session verifier that is derived at least in part from the first and second random numbers;
   validating the session verifier;
   upon successfully validating the session verifier, automatically re-authenticating the client device for the particular server session.

2. A server system as recited in claim 1, wherein said re-authenticating is performed without requesting user credentials.

3. A server system as recited in claim 1, wherein said sharing auto-reconnect data is performed through a secure data communications channel.

4. A server system as recited in claim 1, wherein automatically re-authenticating the client device for the particular server session includes automatically re-authenticating the client device based at least partially on the session ID.

5. A server system as recited in claim 1, wherein
the session verifier comprises a one-way hash based at least in part on the first and second random numbers.

6. A server system as recited in claim 1, wherein said actions further comprise periodically changing at least a portion of the auto-reconnect data and sending at least said changed portion to the client device.

7. A server system as recited in claim 1, further comprising periodically changing the first random number and sending it to the client device.

8. A client device programmed to perform actions comprising:
providing user credentials to a server system to authenticate the client device with the server system;
initiating a server session on a server system, the server session being associated with the client device;
sharing auto-reconnect data with the server system, the auto-reconnect data including a session ID and a first random number;
after losing and re-establishing communications with the server system, sharing a second random number with the server system, and deriving a session verifier at least in part from the first and second random numbers;
requesting automatic re-authentication by the server system without providing user credentials, wherein said requesting comprises sending the session ID and the session verifier to the server system.

9. A client device as recited in claim 8, wherein said actions further comprise periodically sharing a changed first random number with the server system.

10. A client device as recited in claim 8, wherein the auto-reconnect data is received from the server system.

11. A methods comprising:
establishing data communications between a client device and a server system;
authenticating the client device for a particular server session;
sharing auto-reconnect data between client device and the server system, the auto-reconnect data including a session ID associated with the particular server session and a first random number;
re-establishing data communications between the client device and the server system after a communications failure;
after re-establishing data communications, sharing a second random number between the client device and the server device;
deriving a client session verifier at the client device at least in part from the first and second random numbers;
providing the client session verifier and the session ID from the client device to the server system;
deriving a server session verifier at the server system at least in part from the first and second random numbers;
validating the client session verifier by comparing it to the server session verifier;
upon successfully validating the session verifier, automatically re-authenticating the client device for the particular server session.

12. A method as recited in claim 11, wherein
the client session verifier and server session verifier comprise a one-way hash based at least in part on the first and second random numbers.

13. A method as recited in claim 11, further comprising periodically changing at least a portion of the auto-reconnect data and sharing at least said changed portion between the client device and the server device.

14. A method as recited in claim 11, further comprising periodically changing the first random number and sharing it between the client device and the server device.

* * * * *

UNITED STATES PATENT AND TRADEMARK OFFICE
CERTIFICATE OF CORRECTION

| | | |
|---|---|---|
| PATENT NO. | : 7,475,421 B2 | Page 1 of 1 |
| APPLICATION NO. | : 11/275711 | |
| DATED | : January 6, 2009 | |
| INVENTOR(S) | : Nadim Y. Abdo et al. | |

It is certified that error appears in the above-identified patent and that said Letters Patent is hereby corrected as shown below:

In column 12, line 3, in Claim 11, delete "methods" and insert -- method, --, therefor.

Signed and Sealed this
Third Day of May, 2011

David J. Kappos
*Director of the United States Patent and Trademark Office*